Patented Apr. 25, 1944

2,347,460

UNITED STATES PATENT OFFICE 2,347,460

PROCESS FOR TREATING FAT-SOLUBLE VITAMIN-CONTAINING OILS

Loran O. Buxton, Belleville, N. J., assignor to National Oil Products Company, Harrison, N. J., a corporation of New Jersey No Drawing. Application February 29, 1940, Serial No. 321,409

12 Claims. (Cl. 167—81)

This invention relates to the treatment of fat-soluble vitamin-containing oils, more particularly to a process for increasing the vitamin potencies of fat-soluble vitamin-containing oils.

As is well known, vegetable oils have been destearinated by dissolving the oils in solvents therefor and cooling the oils to low temperatures. Application of this process to the refining of fat-soluble vitamin-containing oils effects removal of stearin and some other constituents, and thus increases the vitamin potencies of the oils; however, this increase is ordinarily relatively small. Since it is often desirable to increase the potencies of fat-soluble vitamin-containing oils to values substantially above those which may be obtained by the above described destearination process, there has been a considerable demand in the art for a process capable of effecting this result; this demand, however, is as yet completely unsatisfied.

U. S. Patent 1,678,454 describes a process for recovering the antirachitic principle from cod liver oil which involves extracting cod liver oil with cold alcohol, converting the fatty acids contained in the extract into their sodium soaps by the addition of an aqueous sodium hydroxide solution, adding additional water to dissolve the sodium soaps, precipitating calcium soaps of the fatty acids by the addition of calcium chloride to the aqueous solution, and then dissolving the antirachitic principle out of the calcium soaps by washing with acetone. According to the patent the alcoholic extract obtained from cod liver oil contains fatty acids, cholesterol, amines and bases in addition to the antirachitic principle, but does not contain any vitamin A; this statement is confirmed by an article in the "Quarterly Journal of Pharmacy and Pharmacology" volume 1, pp. 539–545, (1928), in which it is stated that vitamin A is present in cod liver oil in a form insoluble in ethyl alcohol. Therefore, while the process of the above patent is useful for preparing antirachitically active products, the resulting products do not contain substantial amounts of vitamin A and hence are not particularly valuable for the preparation of vitamin A-containing materials.

German Patent 560,146 proposes to extract cod liver oil or other lecithin-containing oils with hot ethyl alcohol, whereby an extract rich in cholesterol and having an increased vitamin D content is obtained. This process is not particularly valuable commercially, since the yields obtained are extremely small and the cost of the treatment causes the resulting products to be far more expensive than is warranted by their vitamin contents. Cod liver oil contains at the most about 1.75% unsaponifiable matter and usually contains much less than this value; my experiments have indicated that this low unsaponifiable value may be responsible for the poor results obtained by treating cod liver oil in accordance with the German patent. In any event the process described in the German patent has not received any substantial commercial application.

It is an object of this invention to provide a simple and relatively inexpensive process for increasing the vitamin potencies of the fat-soluble vitamin-containing oils.

I have made the surprising discovery that high potency fractions may be extracted from fat-soluble vitamin-containing oils containing at least 2% unsaponifiable matter, and preferably more than 3% unsaponifiable matter, by contacting such oils with hot methanol or ethanol, and then cooling the mass, preferably to a temperature below about 0° C. Upon cooling, an alcoholic layer separates from the treated oil, which layer has been found to comprise a solution of an oil much more potent in both vitamins A and D than the original oil, the increase in vitamin potencies being at least 50% and usually much more. The alcoholic extracts thus obtained may be used as such for a variety of purposes; moreover, commercially valuable vitamin-containing oils may be recovered from these alcoholic extracts by evaporation of the alcohol or in any other suitable manner. My invention thus provides a simple process for the production of fat-soluble vitamin-containing oils which have much higher A and D potencies than the oils from which they are obtained.

Any fat-soluble vitamin-containing oil, i. e. an oil containing vitamins A, D, E or K, having an unsaponifiable content of at least 2%, and preferably more than 3%, may be treated in accordance with my invention. I have found that the unsaponifiable content of the oil to be treated is an extremely important factor, since oils containing less than 2% unsaponifiable matter when treated by the process of my invention do not yield products having sufficiently increased vitamin potencies to make the process commercially valuable. As examples of oils which may be treated there may be mentioned sword fish liver oil, tuna liver oil, shark liver oil, spear fish liver oil, ling cod liver oil, sole liver oil, halibut liver oil, mackerel liver oil and wheat germ oil; these oils invariably contain more than 2% unsaponifiable matter.

In carrying out the process of my invention a fat-soluble vitamin-containing oil having an unsaponifiable content of at least 2%, and preferably more than 3%, is contacted with hot methanol or ethanol. In some cases it may be advantageous to add a small amount of unsaponifiable material, e. g. squalene, to the oil in order to raise its unsaponifiable content well above 3%. Absolute methanol or ethanol may be employed or the alcohols may contain small amounts of water or other compatible organic solvents. The oil may be contacted with the alcohol by mixing suitable amounts of the two ingredients and then heating the mixture to the desired temperature; or the hot alcohol may be introduced into a body of the oil. It is preferred, however, to gradually add the oil to the preheated alcohol, since under such conditions optimum results are obtained. The quantity of alcohol employed may vary widely, but I prefer to use between about 5 and about 10 parts of alcohol per part of oil to be treated. The temperature of the alcohol may be anywhere in the neighborhood of its boiling point, but I prefer to maintain the alcohol under refluxing conditions until extraction of the vitamin-containing oil is completed; the time for accomplishing this extraction is ordinarily about one hour, but may be somewhat more or less. Inert gas atmospheres may be used.

After the oil has been contacted with the hot alcohol for a suitable period of time, the mass may be permitted to cool to room temperature; the mass is then preferably further cooled to a temperature below about 0° C. The alcoholic layer which separates from the cooled mass may then be withdrawn and processed as desired. This cooling step is extremely important in order to obtain satisfactory products in accordance with my invention, since this step effects the removal of many undesirable constituents from the ultimate products, and thus aids in the production of highly potent oils.

My process may be carried out continuously, if desired, by continuously spraying hot alcohol into a body of a fat-soluble vitamin-containing oil, continuously withdrawing the alcoholic extract from the oil and continuously introducing additional oil to the mass being treated at a suitable rate. This method of operation has been found to be particularly advantageous for large scale operations.

The alcoholic extracts obtained by the process of my invention comprise a solution of an oil containing vitamins A and D in amounts much greater than the amounts contained in the original oil. The extracts may also contain cholesterol and small amounts of free fatty acids. The increase in the vitamin potencies effected by my process may vary somewhat depending upon the particular oil treated and upon the manner in which the process was carried out. However, this increase is at least 50% and in most cases is considerably over 50%; such an increase is far greater than a mere destearination process is capable of effecting. The alcoholic extracts may be used as such for a variety of purposes. I have found that they are particularly adapted for addition to aqueous materials, since considerable amounts of water may be admixed with the extracts without causing oily materials to separate therefrom; this property is of great value since it is well known that fat-soluble vitamins are ordinarily difficult to disperse in aqueous media. The alcoholic extracts may possess undesirable colors and odors, in which case they may be refined in accordance with the many methods known to the art; if desired, the solutions may be treated with alkali in order to remove free fatty acids therefrom.

The fat-soluble vitamin-containing oils may be recovered from the alcoholic extracts by evaporation of the alcohol in a vacuum, whereby highly potent products having wide commercial application may be obtained. In many cases it may be desirable to evaporate only a part of the alcohol from the extract and then recool the remaining extract to cause material relatively insoluble in the alcohol to precipitate, whereupon the remainder of the alcohol may be evaporated; by operating in this manner a product may be obtained having a potency higher than that of the product recovered upon evaporation of all the alcohol. The oils obtained have A and D potencies at least 50% greater than those of the original oils and usually the increase in potency is much greater than 50%. These oils are generally more stable than the starting materials.

The residue which separates from the extract upon cooling may be processed as desired. I have found that this residue may be re-extracted with methanol or ethanol in accordance with the above described process, whereby another alcoholic extract containing an oil of high potency may be obtained. In many cases the oil recovered from the second alcoholic extract has higher vitamin potencies than the oil recovered from the first extract. The residue from the second extraction may likewise be re-extracted with methanol or ethanol, if desired; in general it may be said that so long as the residues from the alcoholic extractions contain appreciable amounts of fat-soluble vitamins, re-extraction will yield a valuable, highly potent extract.

The following examples are illustrative of my invention; amounts are given in parts by weight.

*Example I*

100 parts of a dog fish liver oil containing 26,000 A units per gram and having an unsaponifiable content of 19.6% were gradually sprayed into 720 parts of refluxing methanol with constant agitation, the addition being carried out over a period of about one hour. At the end of this time the mass was permitted to cool to room temperature, and was then further cooled to about 0° C. The alcoholic layer which separated was withdrawn and the alcohol was evaporated therefrom under a vacuum. The resulting product was an oil containing about 100,000 A units per gram.

*Example II*

50 parts of a shark liver oil containing 118,000 A units per gram and having an unsaponifiable content of 6.11% were gradually added to 400 parts of refluxing absolute ethanol over a period of about one hour. At the end of this time the solution was permitted to cool to room temperature, and was then further cooled to about —18° C. The alcoholic layer which separated was removed and filtered, and the alcohol was vacuum distilled therefrom. The resulting product was an oil containing 309,000 A units per gram.

*Example III*

400 parts of a shark liver oil containing 24,000 A units per gram and having an unsaponifiable content of 19.6% were slowly added to 1280 parts of refluxing 95% ethanol, and the mixture was then refluxed for one hour. At the end of this time the mixture was permitted to cool to room temperature, and was then further cooled to a temperature of about −16° C. and maintained at this temperature for about 12 hours. The alcoholic layer which separated was removed and the alcohol vacuum distilled therefrom. The resulting oil contained 105,500 A units per gram. The residue from the alcoholic extraction was mixed with 960 parts of refluxing 95% ethanol and extracted as described above. The resulting oil contained about 97,100 A units per gram.

*Example IV*

50 parts of a shark liver oil containing 109,500 A units per gram and having an unsaponifiable content of 7.3% were slowly added to 360 parts of refluxing methanol with constant agitation. After the addition of the oil the mixture was permitted to cool to room temperature and was then further cooled to −16° C. The alcoholic layer which separated was withdrawn and the alcohol vacuum distilled therefrom. The resulting oil contained about 202,000 A units per gram.

*Example V*

50 parts of a shark liver oil containing 109,500 A units per gram and having an unsaponifiable content of 7.3% were slowly added to 320 parts of refluxing 95% ethanol with constant agitation. The mixture was permitted to cool to room temperature and was then further cooled to about −16° C. The alcoholic layer which separated was withdrawn and the alcohol vacuum distilled therefrom. The resulting oil contained about 242,000 A units per gram.

*Example VI*

25 parts of a fish liver oil containing 219,000 A units per gram and having an unsaponifiable content of about 12% were gradually added to 200 parts of refluxing 95% ethanol. After all the oil had been added, the mixture was cooled to about −18° C., the alcoholic layer removed, and the alcohol vacuum distilled therefrom. The resulting oil contained 314,000 A units per gram. The solid residue from which the alcoholic layer was separated was mixed with 200 parts of refluxing 95% ethanol and treated as above described; the oil extracted contained about 404,000 A units per gram.

It will be evident from the above description that the process of my invention provides an excellent method for substantially increasing the potencies of fat-soluble vitamin-containing oils. Moreover, my process produces products of such increased commercial value that the cost of carrying out the process is completely offset thereby. Therefore, the process of my invention will be of great interest to those engaged in the preparation of vitamin products.

It is to be understood that the vitamin contents of the various oils mentioned in the specification are given in International Vitamin Units.

Since certain changes in carrying out the above process and certain modifications in the products which embody the invention may be made without departing from its scope, it is intended that all matter contained in the above description shall be interpreted as illustrative and not in a limiting sense.

Having described my invention, what I claim as new and desire to secure by Letters Patent is:

1. A process for obtaining high potency extracts from fat-soluble vitamin-containing oils, which comprises contacting a fat-soluble vitamin-containing oil having an unsaponifiable content of at least 2% with an alcohol selected from the group consisting of methanol and ethanol at an elevated temperature, cooling the mass to a temperature below 0° C., and recovering the alcoholic layer which separates from the cooled mass.

2. A process for obtaining high potency extracts from fat-soluble vitamin-containing oils, which comprises contacting a fat-soluble vitamin-containing oil having an unsaponifiable content of at least 3% with an alcohol selected from the group consisting of methanol and ethanol at an elevated temperature, cooling the mass to a temperature below about 0° C., and recovering the alcoholic layer which separates from the cooled mass.

3. A process for obtaining high potency extracts from fish liver oils, which comprises contacting a fish liver oil having an unsaponifiable content of at least 2% with an alcohol selected from the group consisting of methanol and ethanol at an elevated temperature, cooling the mass to a temperature below 0° C. and recovering the alcoholic layer which separates from the cooled mass.

4. A process for obtaining high potency extracts from fish liver oils, which comprises contacting a fish liver oil having an unsaponifiable content of at least 3% with an alcohol selected from the group consisting of methanol and ethanol at an elevated temperature, cooling the mass to a temperature below about 0° C., and recovering the alcoholic layer which separates from the cooled mass.

5. A process for obtaining high potency extracts from fish liver oils, which comprises gradually mixing about 1 part of a fish liver oil having an unsaponifiable content of at least 3% with between about 5 and about 10 parts of refluxing methanol, cooling the mass to a temperature below about 0° C., recovering the alcoholic layer which separates from the cooled mass and evaporating the alcohol.

6. A process for obtaining high potency extracts from fish liver oils, which comprises gradually mixing about 1 part of a fish liver oil having an unsaponifiable content of at least 3% with between about 5 and about 10 parts of refluxing ethanol, cooling the mass to a temperature below about 0° C., recovering the alcoholic layer which separates from the cooled mass and evaporating the alcohol.

7. A process for obtaining high potency extracts from fish liver oils, which comprises contacting shark liver oil with an alcohol selected from the group consisting of methanol and ethanol at an elevated temperature, cooling the mass to a temperature below about 0° C., and recovering the alcoholic layer which separates from the cooled mass.

8. A process for obtaining high potency extracts from fish liver oils, which comprises contacting sword fish liver oil with an alcohol selected from the group consisting of methanol and ethanol at an elevated temperature, cooling the mass to a temperature below about 0° C., and recovering the alcoholic layer which separates from the cooled mass.

9. A process for obtaining high potency extracts from fish liver oils, which comprises contacting tuna liver oil with an alcohol selected from the group consisting of methanol and ethanol at an elevated temperature, cooling the mass to a temperature below about 0° C., and recovering the alcoholic layer which separates from the cooled mass.

10. The alcoholic solution of the extract recovered in accordance with claim 4, said solution containing fatty material and being readily dispersible in an aqueous medium.

11. The methanol solution of the extract recovered in accordance with claim 4, said solution containing fatty material and being readily dispersible in an aqueous medium.

12. The ethanol solution of the extract recovered in accordance with claim 4, said solution containing fatty material and being readily dispersible in an aqueous medium.

LORAN O. BUXTON.